United States Patent Office 3,124,466
Patented Mar. 10, 1964

3,124,466
COLORED GLUTEN
Elliott M. Ziegenfuss, Keokuk, Iowa, assignor to General
Mills, Inc., a corporation of Delaware
No Drawing. Filed Jan. 24, 1961, Ser. No. 84,505
2 Claims. (Cl. 99—148)

The present invention relates to a method of uniformly coloring gluten products. More particularly, it relates to a method of preparing dry powdered gluten products which, upon addition of water, will possess substantially all the properties of freshly prepared gluten except its characteristic creamy-tan color.

Gluten is a tough, viscid nitrogenous fraction of wheat flour which may be obtained by adding water to wheat flour to form a dough and kneading that dough while washing the starch and solubles from it with a stream of water. The thusly prepared gluten is a creamy-tan elastic mass which can be dried, pulverized and sized to produce a dry powder which upon reconstitution with water forms products possessing properties similar to those of freshly prepared gluten.

Among the interesting properties of gluten is its ability to adhere and bind various products together. This property coupled with its high protein food value makes it an extremely attractive candidate for use as an edible agent in binding together particles of food, such as meat.

Unfortunately, in what would be one of their biggest potential uses, that as a binder of cured meats such as ham and the like, ordinary gluten products are completely unacceptable since in the presence of curing agents their already unattractive creamy-tan color takes on an unappetizing greenish cast.

When one attempts to color gluten products so as to mask the characteristic gluten color and prevent the greenish cast from appearing in the presence of curing agents by use of conventional methods such as blending a dry powdered gluten product and a dry powdered dye upon reconstitution with water a mottled product is obtained. Needless to say, the use of such a mottled colored adhesive product even further detracts from the appearance of the final meat product.

It is therefore an object of the present invention to disclose a method of coloring dry gluten products so that upon reconstitution with water, uniformly colored gluten masses are obtained which are acceptable for use as binding agents for cured meat products.

It is also an object of the present invention to disclose a dry gluten composition comprising a food coloring dye and gluten which produces on mixing with water a product in which the color is thoroughly and evenly distributed through the mass of the rehydrated product.

It has now been discovered that these objects and others ancillary thereto are obtained by a method which comprises preparing a wet gluten mass, mixing therewith an aqueous coloring solution, drying said mass by conventional methods reducing the dried mass to produce a powder and obtaining thereby a uniformly colored gluten powder. The power may then be reconstituted when desired by mixing it with water and kneading the mixture to form a glutinous, uniformly colored, rehydrated mass of gluten.

While the theory of the present invention is not entirely understood, several generalizations have been advanced which appear to enhance the understanding of the invention. It appears that when gluten is colored, the coloring material permanently attaches itself to individual gluten particles. Thus, if the distribution of coloring is not uniform during the coloring process, the agglomerates of the coloring material will tend to be permanently fixed in place on the gluten and thereby form a speckled product.

The method of the present invention is as applicable to the coloring of denatured or devitalized gluten as well as vital gluten. The distinction between vital gluten and devitalized or denatured gluten may best be illustrated by reference to the dough-forming properties of the products. Vital gluten is gluten which has been dried at low temperatures so that it retains its dough-forming characteristics, whereas denatured or devitalized gluten is gluten which has been dried at higher denaturing temperatures so that this dough-forming characteristic no longer remains.

In forming a wet gluten mass to be colored by the addition of the coloring solution, I find it preferable although not essential to adjust the proportion so that a wet gluten containing about 60–70% moisture is obtained.

The coloring solution is preferably formed by dissolving any water-soluble certified food color in an aqueous solvent. The amount of dye to be dissolved in the liquid, of course, varies with the intensity of color desired in the finished product. This amount can best be determined by test sampling procedures.

While the volume of the dye solution to be used need not be large, it is quite important that the solution contain sufficient liquid to form a uniform distribution of the color in the wet gluten and not be in such excess that it unnecessarily extends the kneading required for the gluten to absorb the coloring.

In the preferred practice of the present invention, the coloring solution is prepared by dissolving a predetermined amount of food dye in an aqueous medium. The solution thus formed is then gradually added with kneading to a mass of wet gluten. The gluten is kneaded either mechanically or by hand in such a manner as to cause the uncolored surfaces of the gluten mass to be exposed to the coloring solution.

The colored wet gluten mass is then dried using standard procedures known to the art of drying gluten, for example either by vacuum drying, spray drying, flash drying, etc., or by heat alone, the latter producing denatured gluten while the former methods of drying produce vital gluten.

The dried colored gluten product is then powdered using mechanical mills to produce a fine powder which is essentially uniform in color. The finished product can then be combined with water in a ratio of one part gluten with about two parts water and kneaded to form a uniformly colored, rehydrated gluten mass.

The present invention is further illustrated by reference to the following examples. Unless otherwise indicated, all parts and percentages used herein are by weight.

*Example I*

Eight and one-half pounds of wet gluten containing approximately 66% water was kneaded with a solution prepared by dissolving 0.23 gram FD&C Red #2 in 50 ml. of water. The dissolved dye was added to the mass of wet gluten in small increments of about 5 ml. each. Between each addition of dye solution, the gluten was kneaded for one to five minutes, exposing uncolored surfaces to which more dye solution was added. The colored gluten was then vacuum dried for four hours under a vacuum of 28–29 inches mercury, after which time the moisture content was in the range of 1–5%. The dried, colored gluten was then ground through a laboratory Raymond Mill utilizing a screen with openings of $1/32$ inch. The powdered gluten was uniformly pink colored. A uniformly pink colored gluten mass was prepared by mixing 28 grams of the powdered gluten product with 40 ml. of water. This rehydrated gluten when used to bind pieces of cured meat together did not assume a greenish cast, but rather remained an appetizing meat-colored pink.

Example II

The procedure of Example I was repeated utilizing 0.17 gram of FD&C Red #2. The results were approximately the same, except that the final gluten product when rehydrated was a lighter pink.

Example III

This example and the following Example IV are for comparison purposes.

To 8.5 lbs. wet gluten 0.23 gram of FD&C Red #2 was added as a powder. The dye and the gluten were kneaded. Even after a long kneading time (10 minutes) the gluten and dye mixture was mottled in appearance. The mixture was then vacuum dried and processed as in Example I. The rehydrated product was a mottled red unacceptable for use in binding cured meats.

Example IV

To 50 grams of vacuum dried gluten processed as in Example I was added 0.01 gram of FD&C Red #3. The mixture was mulled in a mortar for 10 minutes. Upon reconstitution there was obtained a mottled product having many bright red spots, thereby making it unacceptable for use in binding cured meat products.

The abbreviation "FD&C" above and throughout the specification refers to the "U.S. Food, Drug and Cosmetics" approved food color dyes.

While for purposes of illustration, I have described the use of dyes acceptable in food products, it will be readily apparent that the procedure which I have disclosed is applicable to prepare colored gluten products which may be used in non-food products as well. In these instances, of course, it would not be necessary to use food colorings since toxic dyes could be used if desired.

It will likewise be apparent that the wet gluten mass to be colored may be formed either by reconstituting a dried gluten product or by washing a wheat dough to obtain freshly prepared gluten.

It is to be understood that all modifications and variations, changes in proportions, ingredients, etc., which may be made by those skilled in the art should be encompassed in the spirit and scope of my present invention.

The embodiments of the present invention in which an exclusive property or privilege is claimed, are defined as follows:

1. The method of preparing a uniformly colored dry gluten powder which consists of forming a wet gluten mass, mixing thoroughly therewith an aqueous liquid coloring solution, drying said mass, and then pulverizing the dried mass to obtain the uniformly colored dry gluten powder.

2. The uniformly colored dry gluten powder produced by the process of claim 1.

References Cited in the file of this patent

UNITED STATES PATENTS

| | | |
|---|---|---|
| 1,729,590 | Morris | Sept. 24, 1929 |
| 2,012,708 | Bostrom et al. | Aug. 27, 1935 |
| 2,215,168 | Allred | Sept. 17, 1940 |

FOREIGN PATENTS

| | | |
|---|---|---|
| 596,566 | Great Britain | Jan. 7, 1948 |
| 617,501 | Canada | Apr. 4, 1961 |